United States Patent
Murai et al.

[11] Patent Number: 5,770,301
[45] Date of Patent: Jun. 23, 1998

[54] BARRIER COMPOSITE FILMS AND A METHOD FOR PRODUCING THE SAME

[75] Inventors: Takaaki Murai, Hiroshima; Ryuta Miyake, Amagasaki, both of Japan

[73] Assignee: Daicel Chemical Industries, Ltd., Osaka, Japan

[21] Appl. No.: 732,226

[22] PCT Filed: Mar. 13, 1996

[86] PCT No.: PCT/JP96/00614

§ 371 Date: Oct. 25, 1996

§ 102(e) Date: Oct. 25, 1996

[87] PCT Pub. No.: WO96/28299

PCT Pub. Date: Sep. 19, 1996

[30]  Foreign Application Priority Data

Mar. 14, 1995  [JP]  Japan ........................................ 7/83308

[51] Int. Cl.$^6$ ........................... B32B 27/32; B32B 27/34; B32B 27/36
[52] U.S. Cl. ........................ 428/213; 427/387; 428/215; 428/216; 428/447; 428/448; 428/451
[58] Field of Search ................................. 428/35.3, 35.4, 428/35.8, 36.6, 36.7, 213, 215, 216, 446, 448, 447, 451; 427/387

[56] References Cited

U.S. PATENT DOCUMENTS 5,100,720  3/1992  Sawada et al. ......................... 428/215

FOREIGN PATENT DOCUMENTS

| | | |
|---|---|---|
| 60-27532 | 2/1985 | Japan . |
| 63-237940 | 10/1988 | Japan . |
| 1202435 | 8/1989 | Japan . |
| 1202436 | 8/1989 | Japan . |
| 1297237 | 11/1989 | Japan . |
| 3-53938 | 3/1991 | Japan . |
| 386539 | 4/1991 | Japan . |
| 3-239537 | 10/1991 | Japan . |
| 4-80031 | 3/1992 | Japan . |
| 4173137 | 6/1992 | Japan . |
| 5-131590 | 5/1993 | Japan . |

*Primary Examiner*—D. S. Nakarani
*Attorney, Agent, or Firm*—Birch, Stewart, Kolasch & Birch, LLP

[57] ABSTRACT

At least one side of a polyester or other base film is successively covered with an inorganic layer composed of a silicon oxide or the like and a coating layer comprising a silane coupling agent and a barrier resin (e.g. vinylidene chloride-based copolymer, ethylene-vinyl alcohol copolymer) to provide a barrier composite film. The amount of the silane coupling agent is about 0.05 to 10 parts by weight relative to 100 parts by weight of the barrier resin. A heat-sealing layer is optionally formed on the surface of the barrier resin coating layer or on the other side of the base film. Such barrier composite film has excellent transparency and retains high barrier properties and adhesive properties of covering layer despite its thin covering layer.

24 Claims, No Drawings

BARRIER COMPOSITE FILMS AND A METHOD FOR PRODUCING THE SAME

TECHNICAL FIELD

The present invention relates to a barrier composite film (gas barrier composite film) having improved gas barrier properties typically with respect to water vapor, oxygen gas and aroma or fragrance component and being, therefore, suitable for use as a film for preservation of a dried food, a film for the retort treatment or microwave heating of food or a packaging film for pharmaceutical products and precision electronic devices, films for production of a balloon or fly balloon, among other applications, and a method for producing the film.

BACKGROUND TECHNOLOGY

Coating of a base film with an extremely thin layer of an inorganic oxide insures remarkable improvement of barrier properties of the base film and hence provide a broader choice for the base film in relation with the heat resistance, mechanical characteristics or other properties. Further, it has been proposed formation of a synthetic resin layer on such inorganic oxide thin layer to impart heat-sealing properties to a barrier film or to protect an inorganic oxide thin layer.

By way of illustration, Japanese Patent Application Laid-open No. 27532/1985 (JP-A-60-27532) discloses a formation of a polymer layer on an inorganic oxide thin layer formed on a polyolefin film by dry-laminating or extrusion-laminating, and Japanese Patent Application Laid-open No. 237940/1988 (JP-A-63-237940) discloses a composite film comprising typically an indium oxide or tin oxide-sputtered film carrying a heat-sealing layer typically composed of an ethylene-propylene copolymer. Japanese Patent Application Laid-open No. 202435/1989 (JP-A-1-202435) and Japanese Patent Application Laid-open No. 202436/1989 (JP-A-1-202436) each discloses a packaging material for microwave cooker use or retort processing which comprises a base film supporting a vapor-deposited silicon oxide layer and either a heat-sealing layer or a protective layer, the heat-sealing layer comprising a heat-sealing resin film, typically a polypropylene film, as laminated, while the protective layer comprising a film as laminated or a thermosetting resin layer as coated. Japanese Patent Application Laid-open No. 297237/1989(JP-A-1-297237) discloses lamination of a film carrying an inorganic oxide thin layer with a biaxially oriented nylon film, and Japanese Patent Application Laid-open No. 86539/1992 (JP-A-3-86539) discloses laminating or coating of a film supporting an inorganic oxide thin layer with a vinylidene chloride-based resin, for example. Japanese Patent Application Laid-open No. 173137/1993 (JP-A-4-173137) proposes coating of a film supporting an inorganic oxide thin layer with a vinyl chloride-vinyl acetate copolymer, a polyamide, a polyester, an acrylic resin or others, or coating such film with a hot-melt coating composition.

However, when such polymer layer is formed on the barrier film by extrusion-lamination, a crack or defect is formed in the inorganic thin layer formed on the base film by heat and external mechanical forces due to lamination, so that barrier properties are extremely sacrificed. In the film as produced by dry-laminating a various film on the base film supporting the inorganic thin layer, the inorganic thin layer formed on the base film is apt to be destroyed on exposure to external mechanical forces in lamination of films or application of an adhesive agent. On the other hand, when a protective layer is coated on the inorganic thin layer on the base film by coating, barrier properties are not manifested by coating, and the inorganic thin layer is immediately fractured on exposure to external mechanical forces, so that barrier properties are remarkably deteriorated.

In these films including films as produced by laminating or coating the inorganic oxide thin layer supported on the base film with, for example, vinylidene chloride-based resin, the adhesive properties of the inorganic oxide thin layer with respect to the base film are low, and sufficiently high adhesive properties and excellent barrier properties can hardly be maintained or retained over a long period of time when the films are used as packaging materials exposed to external mechanical forces or as packaging materials used at high temperature and high humidity.

Further, packaging films as used for food, pharmaceutical products, precision electronic devices, for instance, require high transparency for the visual accessibility or esthetic acceptabilities. The transparency is, however, apt to be lost associated with the decrease of the adhesive properties of the inorganic thin layer.

Thus, in the conventional films, it is difficult to inhibit the loss of barrier properties due to external mechanical forces associated with their processing or usage. Particularly, it is impossible to provide a film which would show good barrier properties, in addition to flexibility and clarity (transparency), despite a thin covering layer. Thus, these conventional films still have much to be desired in their protective effect on contents and in the visual accessibility of the contents.

It is, therefore, an object of the present invention to provide a barrier composite film having remarkably improved adhesive properties between a base film and an inorganic thin layer and significantly excellent barrier properties and a method of producing the same.

It is another object of the invention to provide a barrier composite film which inhibits loss of barrier properties with retaining high adhesive properties between a base film and an organic thin layer even on exposure to external mechanical forces such as holding or flexing or used at high temperature and/or high humidity and a method for producing such film.

A yet another object of the invention is to provide a barrier composite film which insures an extremely minimized solvent remained after printing or laminating processes and a method for its production.

A further object of the invention is to provide a barrier composite film which retains its high barrier properties and high clarity despite its thin covering layer and a production method thereof.

It is still another object of the invention is to provide a barrier film which inhibits loss of its clarity and barrier properties even on exposure to high temperature and/or high humidity due to microwave heating or retort treatment and suppresses degradation and decomposition to thereby provide for long-term preservation of packaged items and a method for producing the film.

DISCLOSURE OF THE INVENTION

For the purpose of accomplishing the above-mentioned objects, the inventors of the present invention did much research and, as a result, found that when an inorganic layer formed on the surface of a base film is coated with a coating composition containing a barrier resin and a silane coupling agent, there can be obtained a composite film having not only improved adhesive properties of the inorganic layer with respect to the base film but also enhanced barrier properties, with the loss of barrier properties inhibited even under external mechanical forces or high temperature and/or high humidity conditions.

Thus, the barrier film of the present invention comprises a base film layer, at least one side of which has been covered with a barrier resin coating layer containing a silane coupling agent through the interposition of an inorganic layer. The base film layer may be formed by using various polymers, typically olefinic polymers, polyesters and polyamides. The inorganic layer mentioned above can be provided by using, for example, any metal selected from among Group 2A elements of Periodic Table, transitional elements, Group 2B elements, Group 3B elements, Group 4B elements and Group 6B elements or inorganic compounds of such metals. The barrier resin coating layer can be formed by coating a coating composition containing a silane coupling agent (e.g. a silicon compound having at least one functional group selected from the group consisting of a halogen atom, an epoxy group, an amino group, a hydroxyl group, a mercapto group, a vinyl group and a (meth)acryloyl group, and an alkoxy group) and a barrier resin (e.g. a vinylidene chloride-based copolymer, an ethylene-vinyl alcohol copolymer or the like).

The other side of the base film or the exposed surface of the barrier resin coating layer may be covered with a heat-sealing layer.

The thickness of the inorganic layer may be about 100 to 5,000 Å and the thickness of the barrier resin coating layer may be about 0.05 to 15 $\mu$m. The ratio of the thickness T ($\mu$m) of the barrier resin coating layer to the thickness t ($\mu$m) of the inorganic layer, i.e. T/t, can be selected from the range of about 0.1 to 1,500.

The barrier composite film of the invention further includes a barrier composite film which comprises a base film layer, an inorganic oxide thin layer formed on at least one side of the base film layer, and a coating layer containing a barrier resin as a main component formed on the thin layer, wherein a peeling strength of the coating layer with respect to the baser film layer, after storage at 40° C. and 90% R.H. for 1 week, of not less than 100 g/15 mm.

The term "barrier resin coating layer" as used throughout this specification means a layer comprising a barrier resin with an oxygen gas permeability not greater than 20 cc/m$^2$·24 hr. at 25° C. and a water vapor permeability of not greater than 20 g/m$^2$·24 hr. at 40° C. and 90% R.H. at a layer thickness of 2 $\mu$m. The term "heat-sealing layer" means a thermally sealable layer not only by means of a heat sealer but also by impulse sealing, high frequency bonding, ultrasonic sealing and other bonding techniques.

BEST MODE FOR PRACTICING THE INVENTION

The polymer that can be used for the formation of the base film layer includes a variety of film-formable polymers, e.g. polyolefins such as polyethylene, an ethylene-ethyl acrylate copolymer, ionomers, polypropylene, an ethylene-propylene copolymer, poly-4-methylpentene-1, etc.; polyesters such as a polyalkylene terephthalate (e.g. polyethylene terephthalate, polybutylene terephthalate), polyethylene 2,6-naphthalate, etc.; polyamides such as nylon 6, nylon 11, nylon 12, nylon 66, nylon 610, nylon 6/66, nylon 66/610, nylon MXD etc.; polyvinyl chloride; polyvinylidene chloride series resins such as polyvinylidene chloride, vinylidene chloride-vinyl chloride copolymer, vinylidene chloride-acrylonitrile copolymer, vinylidene chloride-(meth)- acrylate copolymer, etc.; styrenic resins such as polystyrene, styrene-acrylonitrile copolymer, styrene-acrylonitrile-butadiene copolymer, etc.; polyvinyl alcohol; polyamideimides; polyimides; polyetherimides; polycarbonates; polysulfones; polyethersulfones; polyetheretherketones; polyarylates; polyphenylene sulfide; polyphenylene oxide; polyparaxylene; polyacrylonitrile; fluororesins such as polytetrafluoroethylene, polytrifluorochloroethylene, ethylene fluoride-propylene copolymer, etc.; cellulosic polymers such as cellophane; rubber hydrochloride; and copolymers containing constituent units of the various polymers mentioned above. These polymers can be used singly or in combination.

The base film layer may contain a variety of additives, for example stabilizers such as antioxidants, ultraviolet absorbers, heat stabilizers, etc.; antistatic agents such as cationic, anionic, nonionic or amphoteric antistatic agents; nucleating agents; hydrocarbon polymers such as styrenic resins, terpene resins, petroleum resins, dicyclopentadiene resin, chmarone resins such as chmarone-indene resin, phenolic resins, rosins and their derivatives, and the corresponding hydrogenated resins; plasticizers; fillers; various waxes such as higher fatty acid amides, higher fatty acids or their salts, higher fatty acid esters, natural waxes of mineral or vegetable origin, synthetic waxes such as polyethylene; particulate lubricants inclusive of finely divided mineral lubricants such as silica series powders, alumina series powders, etc. and finely divided organic lubricants such as polyethylene series powders, acrylic powders, etc.; and coloring agents.

The light transmittance value of the base film layer can be selected as desired but for insuring a sufficient visual access to contents and an aesthetic acceptability of the packaged product, the total light transmittance with respect to white light is generally not less than 40%, preferably not less than 60%, and more preferably not less than 80%.

The base film layer is preferably formed from an olefinic polymer (particularly polypropylene series polymers), polyester (particularly, polyalkylene terephthalate such as polyethylene terephthalate), polyamide, styrenic polymer, ethylene-vinyl alcohol copolymer, polycarbonate, polyacrylonitrile or the like. The olefinic polymers, polyesters and polyamides are particularly desirable in terms of clarity, mechanical strength and packaging quality.

The preferred material for the packaging of food for retort treatment or microwave heating includes polymers having high transparency, mechanical strength and packaging quality and having excellent heat resistance, such as polypropylene, polyesters, polyamides, ethylene-vinyl alcohol copolymer, polycarbonates and polyacrylonitrile. Particularly preferred polymers for the base film layer includes polypropylene, polyesters and polyamides.

The base film layer may be a single-layer film or a laminate film comprising one or more polymer layers. The thickness of the base film is not critical and can be selected appropriately in consideration of the desired packaging quality, mechanical strength, flexibility and so on. The thickness of the base film layer may be generally about 3 to 200 $\mu$m, preferably about 5 to 100 $\mu$m, and more preferably about 10 to 50 mm (e.g. about 10 to 30 $\mu$m).

The base film layer can be formed by the conventional film forming technology which includes, for example, melt-forming method such as the inflation method and the T-die method, and the casting method using a solution. The base film layer may be an unoriented film or an oriented film such as a monoaxially oriented film or a biaxially oriented film.

The method for orientation includes such known drawing or stretching methods as roll drawing or stretching, calender drawing or stretching, belt drawing or stretching, tentering, tube drawing or stretching, or a combination of such techniques. The draw or stretching ratio can be judiciously selected according to the required film characteristics. For example, it may be about 1.5 to 20 and preferably about 2 to 15 in at least one direction.

At least one side of the base film layer may have been surface-treated. The surface treatment includes corona discharge treatment, plasma treatment, glow discharge treatment, reverse sputter treatment, flame treatment, chromic acid treatment, solvent treatment, surface roughening and so on. Of the base film layer, the surface-treated side may be used for the formation of the inorganic layer and barrier resin coating layer for improved adhesion.

In lieu of the surface treatment or in addition thereto, a primer coating layer or under coating layer may be formed on the surface of the base film layer. The under coating layer can be formed using any of various resins such as thermoplastic resins, thermosetting resins, radiation-curable resins (electron beam-curable resin, UV-curable resin, etc.) and coupling agents. Typically, the under coating layer material that can be used includes, for example, thermoplastic resins such as acrylic resin, vinyl chloride-vinyl acetate copolymer, polyvinyl butyral resin, polycarbonate resin, cellulosic polymers, e.g. nitrocellulose and cellulose acetate, rosin-modified maleic acid resin, etc.; thermosetting resins such as urethane resin, urea resin, melamine resin, urea-melamine resin, epoxy resin, etc.; radiation-curable resins such as epoxy (meth)acrylate, urethane(meth)acrylate, etc.; and silane coupling agents. These materials can be used singly or in combination.

The under coating layer may contain an ordinary coloring agent such as a dye or a pigment. The amount of such coloring agent can be selected within the range not adversely affecting the film transparency and is generally about 1 to 30 weight % with respect to the weight of the resin forming the under coating layer. The thickness of the under coating layer is not so critical and is generally about 0.1 to 5 $\mu$m.

There is no particular limitation on the method of forming the under coating layer. The under coating layer can be formed by applying an organic or aqueous (water-based) coating composition containing the above-mentioned under coating layer material or materials by the conventional technique such as roll coating, gravure coating, reverse coating, spray coating, etc. and drying or curing the coating layer. When a radiation-curable resin is employed, the coating layer is irradiated with actinic or active radiation.

The main feature of the present invention resides in using an inorganic layer (in particular the transparent inorganic layer) and barrier resin coating layer containing the silane coupling agent in combination and covering the surface of the base layer. Incidentally, an inorganic layer (especially a transparent inorganic layer) formed on a base film, as being different from aluminium foil, glass or tile, is supposed to be not a wholly homogeneous thin layer but a thin layer having a heterogeneous surface or pin hole with a sacrificed barrier properties. According to the present invention, sites or parts with deteriorated barrier properties, which are dotted in the inorganic layer, are embedded or filled with the barrier resin coating layer so that loss of barrier properties can effectively be inhibited. These advantages are quite distinguishable from films as produced by laminating the inorganic layer with a barrier resin film.

Diffusion of a gas permeated through the inorganic layer may provably be inhibited to some extent by forming a coating layer of a non-barrier resin, but sufficiently high barrier properties can not be expected in such film. Contrary to this, in the present invention, the diffusion of a gas can effectively be inhibited or suppressed by forming a barrier resin coating layer. Further, even if a crack or defect is formed in the inorganic layer due to external mechanical forces acted in processing, typically speaking, the gas diffusion in the barrier resin coating layer can extremely be minimized. Moreover, associated with the incorporation of the silane coupling agent, adhesive properties between the inorganic layer and the barrier resin coating layer can be improved, so that damage (defect or failure) of the inorganic layer on exposure to external mechanical forces is prevented to occur. In addition, even when a crack or defect is formed in the inorganic layer, deterioration of barrier properties can be minimized by the presence of the barrier resin coating layer.

By this composite structure, adhesive properties of the inorganic layer to the base film layer can successfully be improved and the barrier properties can remarkably be enhanced. Further, reductions in adhesive properties and barrier properties under external mechanical load and/or high temperature and high humidity conditions can be remarkably inhibited. Furthermore, a film having high transparency (clarity) and good barrier properties can be obtained despite its thin covering layer, provably because of the excellent affinity between the inorganic layer and the barrier resin coating layer. Moreover, by the combination use of the inorganic layer and the coating layer, the film of the invention can retain an excellent barrier performance even exposed to a high temperature due to, for instance, retort treatment or microwave heating, and in addition, the loss of microwaves in microwave heating such as in microwave cooker is small.

The inorganic substance forming the inorganic layer can preferably be any inorganic substance capable of forming a thin, transparent layer. Thus, the inorganic substance that can be used includes, for example, Group 2A elements of Periodic table such as beryllium, magnesium, calcium, strontium, barium, etc.; transition metal elements such as titanium, zirconium, ruthenium, hafnium, tantalum, etc.; Group 2B elements such as zinc etc.; Group 3B elements such as aluminum, gallium, indium, thallium, etc.; Group 4B elements such as silicon, germanium, tin, etc.; and Group 6B elements such as selenium, tellurium, etc.; and inorganic compounds containing these elements, such as the oxides, halides, carbides and nitrides. These inorganic substances can be employed singly or in combination.

The preferred inorganic substance includes, among others, Group 2A elements such as magnesium, calcium, barium, etc.; transition metal elements such as titanium, zirconium, tantalum, ruthenium, etc.; Group 2B elements such as zinc; Group 3B elements such as aluminum, indium, thallium, etc.; Group 4B elements such as silicon, tin, etc.; Group 6B elements such as selenium; and the oxides of these elements. The inorganic layer is most preferably formed from one of Group 3B or Group 4B elements or its oxide.

Among the inorganic substances mentioned above, the oxides of the elements (e.g. tin oxide, aluminium oxide, indium oxide, the corresponding composite oxide, silicon oxide, etc.) are very satisfactory in transparency and barrier properties. Silicon oxide, in particular, is advantageous in that, in addition to the above characteristics, this oxide provides for a dense film having a high affinity for the polymer forming the barrier resin coating layer containing the silane coupling agent so that the inorganic layer is resistant to cracking or failure due to external forces and shows sustained high barrier properties for a long time even under high temperature conditions. It should be understood that the silicon oxide mentioned above includes not only silicon monoxide and silicon dioxide but also those silicon-containing oxides which may be represented by the compositional formula SiOx (wherein $0<x\leq 2$, preferably $0.8\leq x\leq 1.5$).

Of these inorganic substances, the so-called electrically nonconductive inorganic substances having low electrical conductivity, such as the oxides, halides, carbides and nitrides, can be used for the packaging materials intended for use in microwave heating applications. The preferred nonconductive inorganic substance includes, for example, oxides such as silicon oxide.

The thickness of the inorganic layer can be selected from the range of generally about 100 to 5,000 Å (0.01 to 0.5 μm), preferably about 200 to 3,000 Å (0.02 to 0.3 μm) and more preferably about 300 to 1,500 Å (0.03 to 0.15 μm). If the thickness is less than 100 Å, a homogeneous thin layer can hardly be formed so that no sufficient barrier effect or mechanical strength can be expected. On the other hand, no appreciable improvement in barrier performance can be obtained and loss of clarity or deterioration of the external appearance occurs by increasing the thickness of the layer beyond 5,000 Å and such practice rather results in an economic disadvantage.

As the barrier resin constituting the coating layer, there may be mentioned a resin having the above-mentioned high barrier properties as selected from among vinylidene chloride-based copolymers, ethylene-vinyl alcohol copolymers, polyamide series polymers, polyvinyl alcohol series polymers, polyacrylonitrile series polymers, urethane polymers and so on. Incidentally, the barrier resin mentioned here with reference to the barrier coating layer may occasionally not show the above-specified barrier properties depending on the composition of the barrier resin in the coating layer, such as thermoplastic urethane polymers having comparatively long segment (e.g. polyalkyleneoxy segment). The barrier resins mentioned above can be used singly or in combination.

The preferred barrier resin includes vinylidene chloride-based copolymers and ethylene-vinyl alcohol copolymers. The vinylidene chloride-based polymers are copolymers of vinylidene chloride with other copolymerizable monomers. Among such copolymerizable monomers are vinyl chloride, vinyl acetate, crotonic acid, acrylic acid and acrylates (e.g. a $C_{1-8}$ alkyl acrylate), such as methyl acrylate, ethyl acrylate, propyl acrylate, isopropyl acrylate, butyl acrylate, isobutyl acrylate, tert-butyl acrylate, pentyl acrylate, hexyl acrylate, etc., acrylonitrile, methacrylonitrile, and methacrylic acid and methacrylates corresponding to the acrylic esters mentioned above. Among these vinylidene chloride-based copolymers, the preferred copolymers are vinylidene chloride-acrylonitrile copolymer, vinylidene chloride-methacrylic acid copolymer, vinylidene chloride-acrylate copolymer, vinylidene chloride-methacrylate copolymer, vinylidene chloride-vinyl acetate copolymer and so on. The vinylidene chloride contents of such vinylidene chloride-based copolymers are generally about 85 to 99 weight % and preferably about 90 to 97 weight %.

The ethylene-vinyl alcohol copolymer is preferably a solvent-soluble or soluble-dispersible ethylene-vinyl alcohol copolymer. The ethylene content of such ethylene-vinyl alcohol copolymer is generally about 5 to 50 mol %, preferably about 10 to 45 mol %, and more preferably about 25 to 35 mol % and its molecular weight (weight average molecular weight) may for example be about $1\times 10^4$ to $10\times 10^4$, preferably about $2\times 10^4$ to $7\times 10^4$, and more preferably about $4\times 10^4$ to $5\times 10^4$. The degree of saponification is preferably not less than 99.5%. Such a solvent-soluble ethylene-vinyl alcohol copolymer is soluble or dispersible in water or a mixed solvent of water and alcohol and, on coating, gives a thin film.

Depending on the desired barrier performance (barrier properties with respect to, for example, oxygen, water vapor, carbon dioxide, organic solvent gas and an aroma component such as limonene), the barrier resin coating layer may comprise at least one species or more than one species of the barrier resin (preferably vinylidene chloride-based copolymers and ethylene-vinyl alcohol copolymers). Moreover, the barrier resin coating layer may be formed with a plurality of layers each containing a barrier resin. For example, the barrier resin coating layer may be a multi-layer structure including a vinylidene chloride-based copolymer layer and an ethylene-vinyl alcohol copolymer layer. The barrier resin content of the barrier resin coating layer is not less than 50 weight %, preferably about 75 to 100 weight % and, more preferably about 90 to 100 weight %.

Furthermore, the barrier resin coating layer may contain other polymers, for example olefinic polymers such as ethylene-vinyl acetate copolymer, ethylene-ethyl acrylate copolymer, etc.; acrylic polymers; styrenic polymers; polyesters; polyacetals; polyvinyl acetate; polyvinyl chloride; vinyl chloride-vinyl acetate copolymer; polyamides; urethane series polymers; acrylonitrile series polymers; polycarbonates; chlorinated polyolefins; cellulosic polymers and so on.

Where necessary, the barrier resin coating layer may contain additives such as those mentioned above, and an antiblocking agent and an adhesion-improving agent such as polyethyleneimines, polyisocyanates and so on.

The silane coupling agent includes various compounds which can improve adhesive properties between the inorganic layer, base film layer and barrier coating layer, such as a silicon compound having at least one functional group selected from the group consisting of a halogen atom, an epoxy group, an amino group, a hydroxyl group, a mercapto group, a vinyl group and a (meth)-acryloyl group, and an alkoxy group.

The halogen atom includes fluorine, chlorine, bromine and iodine atoms, and the halogen atom may practically be a chlorine atom or bromine atom. The epoxy group may be composed of an epoxy ring formed by oxidation of an unsaturated bond of a hydrocarbon group (e.g. an unsaturated double bond of cyclopentenyl group, cyclohexenyl group, cyclooctenyl group or other cycloalkenyl group), or an epoxy ring of a glycidyl group. The amino group may be substituted with 1 or 2 lower alkyl groups (e.g. a $C_{1-4}$ alkyl group such as methyl, ethyl, propyl, isopropyl or butyl group). Further, the (meth)acryloyl group may be formed by a (meth)-acryloyloxy group.

As the alkoxy group, there may be mentioned for instance methoxy, ethoxy, propoxy, isopropoxy, butoxy, isobutoxy, s-butoxy, t-butoxy and other $C_{1-4}$ alkoxy groups. Preferred alkoxy group includes a hydrolyzable alkoxy group (in particular, methoxy group or ethoxy group). The silicon compound may have about 1 to 3 (specifically 1 or 2) reactive functional group and about 1 to 3 (practically 2 or 3) alkoxy group.

Preferred example of the silane coupling agent includes a silicon compound shown by the following formula wherein Y represents one functional group selected from the group consisting of a halogen atom, an epoxy group, an amino group, a mercapto group, a vinyl group and a (meth) acryloyl group, R represents a hydrocarbon residue, X indicates the same or different alkoxy group, and n denotes 0 or 1.

The functional group represented by Y and the alkoxy group indicated by X are exemplified with the above mentioned examples.

As the hydrocarbon group represented by R, there may be mentioned for example an alkylene group (e.g. methylene, ethylene, trimethylene, propylene, 2,2-dimethylmethylene, tetramethylene, pentamethylene, hexamethylene or other straight chain or branched chain $C_{1-6}$ alkylene group), a cycloalkene residue (e.g. cycloheptene, cyclohexene, cyclopentene, cyclooctene and other $C_{4-10}$ cycloalkene residue), a cycloalkene-alkyl residue (e.g. cycloheptene-, cyclohexene-, cyclopentene-or other $C_{4-10}$ cycloalkene-$C_{1-6}$ alkyl group) and so on. Incidentally, the cycloalkene residue and cycloalkene-alkyl residue may practically be a residue formed by epoxidation of a double bond as mentioned above. The preferred hydrocarbon residue R includes a $C_{1-4}$ alkylene residue (particularly, a $C_{2-4}$ alkylene residue) and $C_{5-8}$ cycloalkene-$C_{1-4}$ alkyl residue (specifically, a cyclohexene-$C_{2-4}$ alkyl residue), among others.

Further, n is 0 or 1. When Y is a vinyl group, n may practically be 0, and when Y is other functional group, n may practically be 1.

Examples of the silane coupling agent include;

(i) halogen-containing silane coupling agents (e.g. 2-chloromethyltrimethoxysilane, 2-chloroethyltriethoxysilane, 3-chloropropyltrimethoxysilane, 3-chloropropyltriethoxysilane), (ii) epoxy group-containing silane coupling agents [e.g. 2-(3,4-epoxycyclohexyl)ethyltrimethoxysilane, 2-(3,4-epoxycyclohexyl)ethyltriethoxysilane, 3-(3,4-epoxycyclohexyl)propyltrimethoxysilane, 2-glycidyloxy-ethyltrimethoxysilane, 2-glycidyloxyethyltriethoxysilane, 3-glycidyloxypropyltrimethoxysilane, 3-glycidyloxypropyltriethoxysilane, etc.], (iii) amino group-containing silane coupling agents (e.g. 2-aminoethyltrimethoxysilane, 3-aminopropyltrimethoxysilane, 3-aminopropyltriethoxysilane, 2-[N-(2-amino ethyl)amino]ethyltrimethoxysilane, 3-[N-(2-aminoethyl)amino]propyltrimethoxysilane, 3-(2-aminoethyl)-amino] propy ltriethoxysilane, 3-[N-(2-aminoethyl)amino]-propyl methyl dimethoxysilane, etc.), (iv) mercapto group-containing silane coupling agents (e.g. 2-mercaptoethyltrimethoxysilane, 3-mercaptopropyltrimethoxysilane or 3-mercaptopropyltriethoxysilane, (v) vinyl group-containing silane coupling agents (e.g. vinyltrimethoxysilane, vinyltriethoxysilane), and (vi) (meth)acryloyl group-containing silane coupling agents (e.g. 2-methacryloyloxyethyltrimethoxysilane, 2-methacryloyloxyethyltriethoxysilane, 2-acryloyloxyethyltrimethoxysilane, 3-methacryloyloxypropyltrimethoxysilane, 3-methacryloyloxypropyltriethoxysilane, 3-acryloyloxypropyltrimethoxysilane). These silane coupling agents may be used singly or in combination.

The amount of the silane coupling agent can be selected within the range improving the adhesive properties of the inorganic layer, and is, for instance, about 0.05 to 10 parts by weight (e.g. about 0.1 to 10 parts by weight), preferably about 0.1 to 7 parts by weight (e.g. about 0.2 to 7 parts by weight) and more preferably about 0.5 to 5 parts by weight (e.g. about 0.5 to 3 parts by weight) relative to 100 parts by weight of the barrier resin.

The thickness of the barrier resin coating layer can be selected within the range not adversely affecting the film characteristics and may for example be about 0.05 to 15 μm, preferably about 0.1 to 10 μm (e.g. 0.2 to 7 μm), and more preferably about 0.25 to 5 μm (e.g. 0.3 to 3 μm). If the thickness of the coating layer is less than 0.05 μm, sufficiently high barrier properties may hardly be obtained. On the other hand, increasing the thickness beyond 15 μm would not be rewarded with a commensurate improvement in barrier performance but would be rather uneconomical and tend to increase the loss of microwaves in microwave heating.

The thickness ratio of the barrier resin coating layer to the inorganic layer can be selected as desired but this ratio has bearings on barrier properties. In order to provide for high barrier properties and aging resistance, the ratio of the thickness T (μm) of the barrier resin coating layer to the thickness t (μm) of the inorganic layer, i.e. T/t, may for example be about 0.1 to 1,500, preferably about 0.5 to 500 (e.g. about 1 to 200), and more preferably about 1 to 100. In many instances, the preferred ratio is about 2 to 50 (e.g. about 5 to 50). If the thickness ratio deviates from the above range, it will be difficult to provide for high barrier properties. Thus, if the above ratio is less than 0.1, the inorganic layer tends to be cause defects by external forces. On the other hand, increasing the ratio beyond 1,500 would not be rewarded with a commensurate improvement in barrier performance and be uneconomical.

The barrier composite film of the invention also includes, in addition to the above-mentioned barrier composite film, a barrier composite film comprising a base film layer, an inorganic oxide thin layer formed on at least one surface of the base film layer and a coating layer formed on the thin layer and containing the barrier resin as a main component. These composite films show a peeling strength (stripping strength) of the coating layer with respect to the base film layer of not less than 100 g/15 mm (e.g. about 100 to 400 g/15 mm), preferably about 120 to 350 g/15 mm and more preferable about 150 to 300 g/15 mm, after storage at 40° C. and 90% R.H. (relative humidity) for 1 week.

The composite films have excellent gas barrier properties and exhibit an oxygen gas permeability of not greater than 5 cc/m$^2$·24 hr. (e.g. about 0.01 to 3 cc/m$^2$·24 hr.), preferably about 0.01 to 1 cc/m$^2$·24 hr. and more preferably about 0.01 to 0.5 cc/m$^2$ ·24 hr. at 25° C., and a water vapor permeability at 40° C. and 90% R.H. of not greater than 5 g/m$^2$·24 hr. (e.g. about 0.01 to 4 g/m$^2$·24 hr.), preferably about 0.1 to 3.5 g/m$^2$·24 hr. and more preferably about 0.1 to 3 g/m$^2$·24 hr., as determined in a film having the base film layer in 10 to 30 μm thickness and the covering layer comprising the inorganic layer and the coating layer in 0.5 to 5 μm thickness.

To facilitate the production of a bag, a pouch or other container, the barrier resin coating layer may be covered with a heat-sealing layer. Moreover, the heat-sealing layer may be formed on the other side of the base film layer. In this case, one side of the base film layer need only be covered at least with the inorganic layer and barrier resin coating layer.

The polymer that can be used for forming the heat-sealing layer includes heat-bondable polymers, for example olefinic polymers, vinyl acetate-vinyl chloride copolymer, polyesters, polyamides and rubber series polymers. These heat-bondable polymers can be used singly or in combination.

The heat-bondable olefinic polymer includes, for example, polyethylene inclusive of low density polyethylene and linear low density polyethylene, ethylenebutene-1 copolymer, ethylene-(4-methylpentene-1) copolymer, ethylene-hexene-1-copolymer, ethylene-vinyl acetate copolymer, ethylene-(meth)acrylic acid copolymer, ethylene-(meth)acrylate copolymer, ionomers, polypropylene, propylene-butene-1 copolymer, ethylene-propylene copolymer, ethylene-propylene- butene-1 copolymer, ethylene-propylene-diene copolymer, and modified polyolefins such as maleic anhydride-modified polyethylene and maleic anhydride-modified polypropylene. The preferred olefinic polymer includes polyethylene, ethylene-vinyl acetate copolymer, ethylene-ethyl acrylate copolymer, amorphous polyolefins (e.g. amorphous polypropylene), an ethylene-propylene copolymer and so on. When the heat-sealing layer is formed by the lamination technique, the preferred heat-bondable film includes an unoriented polypropylene film and unoriented ethylenepropylene copolymer film.

The heat-bondable polyester includes aliphatic polyesters comprising both an aliphatic diol and an aliphatic dicarboxylic acid. The heat-bondable polyamide includes, for example, nylon 11, nylon 12 and nylon 6/12. The rubber series polymer includes, for example, butyl rubber, isobutylene rubber, chloroprene rubber, styrene-acrylonitrile copolymer, styrene-butadiene copolymer, styrene-acrylonitrile-butadiene terpolymer and so on.

The thickness of the heat-sealing layer can be liberally selected, for example from the range of about 3 to 100 $\mu$m, according to the intended uses for the packaging material. When the heat-sealing layer is provided by the film laminating method, the thickness may for example be about 20 to 100 $\mu$m and is preferably about 30 to 80 $\mu$m.

The heat-sealing layer can be formed in a selected location (e.g. heat-sealing portion) of the surface of the barrier resin coating layer but is generally formed all over the surface of the barrier resin coating layer. Moreover, as mentioned hereinbefore, the heat-sealing layer may be formed in a selected heat-sealing part or the entirety of the other side of the base film layer.

One kind of the barrier film according to the present invention can be obtained by covering at least one side of the base film serially with the inorganic layer and the barrier resin coating layer containing the silane coupling agent.

Another kind of the barrier film according to the present invention can be obtained by a process which comprises covering at least one side of the base film successively with the inorganic layer, barrier resin coating layer containing the silane coupling agent and heat-sealing layer or a process which comprises covering at least one side of the base film successively with the inorganic layer and barrier resin coating layer containing the silane coupling agent and covering the other side of the base film with the heat-sealing layer.

The inorganic layer can be formed by covering the surface of the base film with the inorganic substance utilizing the conventional technology which includes physical methods (e.g. vacuum vapor deposition, reactive vapor deposition, sputtering, reactive sputtering, ion plating, reactive ion plating, etc.) and chemical methods (e.g. CVD, plasma CVD and laser CVD processes). The inorganic layer may be practically formed by physical methods such as vapor deposition and this layer may be formed on one side or both sides of the base film layer.

The barrier resin coating layer can be formed by coating the surface of the inorganic layer with a coating composition containing the barrier resin and the silane coupling agent.

The coating composition or dope can be prepared by using a suitable solvent which can be selected according to the type of barrier resin and silane coupling agent, and it may be a solution or a dispersion.

The solvent for such a coating solution containing a vinylidene chloride-based copolymer can be selected according to the species of vinylidene chloride series copolymer and typically includes, for example, ketones such as acetone, methyl ethyl ketone, cyclohexanone, etc.; ethers such as dioxane, diethyl ether, tetrahydrofuran, etc.; aromatic hydrocarbons such as benzene, toluene, xylene, etc.; esters such as ethyl acetate, butyl acetate, etc.; amides such as dimethylformamide etc.; and mixtures of such solvents. The dispersions are generally available in the form of O/W emulsion from commercial sources.

The coating composition containing an ethylenevinyl alcohol copolymer can be generally prepared by using a mixed solvent composed of water and alcohol. The alcohol that can be used typically includes methanol, ethanol, propanol, isopropyl alcohol, cyclohexanol and so on.

The coating composition described above may contain a variety of additives such as those mentioned hereinbefore. For improved coatability, the composition may contain the conventional additives such as an antifoam and a rheology modifier.

The method for coating is not critical as far as a crack or defect is not formed in the inorganic layer. Thus, the conventional techniques such as air-knife coating, roll coating, gravure coating, blade coating, dip coating, spray coating and other coating methods can be selectively employed. Following application of the coating composition, the coating is dried at a temperature of about 50° to 150° C., whereby the desired barrier resin coating layer is obtained.

Where necessary, the surface of the barrier resin coating layer may be subjected to a conventional surface treatment as illustrated in the explanation of the base film regardless of the presence of the heat-sealing layer or not, or an adhesive layer or protective layer may be formed partially or throughout the whole of the coating layer without such surface treatment.

The heat-sealing layer can be formed by the conventional method according to the type of heat-bondable polymer, such as dry lamination, extrusion lamination or coating.

The barrier composite film of the present invention may be provided, according to the type and intended use of film, with an optional coating layer and/or a laminating layer, such as a lubricating layer, an antistatic layer, an ornamental printed film layer or a reinforcing layer such as a nylon film.

INDUSTRIAL APPLICABILITY OF THE INVENTION

The barrier composite film of the present invention wherein an inorganic thin layer is coated with a barrier resin coating layer containing a silane coupling agent insures remarkable improvement of adhesive force between the inorganic layer and the base film layer and, significantly enhanced barrier properties. Further, the film exhibits excellent barrier properties over a long period with maintaining high adhesive properties between the inorganic layer and base film layer, even when exposed to external mechanical forces such as bending or flexing or used in high temperature and/or high humidity conditions. Moreover, despite its thin covering layer, the film has excellent barrier properties and high clarity. Therefore, the film insures inhibition of decrease of adhesive properties of the inorganic layer, clarity and barrier properties even when exposed to external mechanical forces or high temperature and/or high humidity conditions due to microwave heating or retort treatment, so that it provides a long-term preservation of contained items with inhibiting deterioration or decomposition.

Further, in the barrier composite film of the invention, permeation or penetration of a solvent contained in a printing ink or laminating adhesive agent to the base film is remarkably suppressed or prevented when printing or laminating is conducted on the barrier resin coating layer according to a conventional technology so that the solvent remained in the film is extremely minimized. Therefore, the film insures high safety in packaging application for food.

Therefore, in packaging applications, the film can be advantageously used for the packaging of various product items such as food for microwave oven cooking, retort foods, frozen foods, products to be microwave-sterilized, flavor barrier-packaged items, pharmaceutical products, precision electronic components, etc. and for the production of balloons. Furthermore, in food packaging use, the film preserves food for a long time with suppressed aging and degradation. As described herein above, the present invention also discloses a use of the barrier composite film for packaging of various contents such as food, pharmaceutical products and electronic devices.

There is no particular restriction to the form of package that can be provided using the film of the present invention. Thus, for example, bags or pouches for formed foods such as hamburgers, shaomai, gyoza, etc. and those for liquid items such as curry, various soups, coffee, tea, etc. may be mentioned. Bags or pouches containing such food items can be directly submitted to retort treatment or microwave heating. Furthermore, when the film is used as an inner bag for a paper container as it is the case with a sake pack, for instance, the contents can be safely heated by, for example, microwave heating. In other words, sake can be warmed up as packaged with convenience, to mention an example.

The package form which the packaging material of the present invention can provide includes containers such as various types of bags or pouches, cups, tubes, standing bags, trays, etc., covers, interliners for paper packs for sake, soy, mirin, oil, milk, fruit juice and so on.

EXAMPLES

The following examples are intended to illustrate the present invention in more detail but should by no means be construed as defining the scope of the invention.

Comparative Example 1

By the vacuum vapor deposition technique using SiO as the vapor source, a 1,000 Å-thick silicon oxide vapor deposit layer was deposited, as an inorganic layer, on one side of a 12 $\mu$m thick biaxially oriented polyethylene terephthalate film in a vacuum of $5\times10^{-5}$ Torr to provide a composite film.

EXAMPLES 1 AND 2

To 100 parts by weight of a vinylidene chloride-based copolymer (trade name: Saran Resin F 216, manufactured by Asahi Chemical Industry Co., Ltd.) was added 1.0 part by weight of γ-glycidoxypropyltrimethoxysilane (i.e. 3-glycidyloxypropyltrimethoxysilane) (trade name: TSL 8350, manufactured by Toshiba Silicone Co., Ltd.), and the resultant mixture was dissolved in a mixed solvent of toluene-tetrahydrofuran (½, by weight) to prepare a coating composition of 15% by weight resin concentration for the formation of a barrier resin coating layer. Incidentally, the vinylidene chloride-based copolymer is a copolymer obtainable by copolymerizing 85 mol % or more of vinylidene chloride monomer as a main component and, as comonomer, at least one of acrylic acid, methyl methacrylate or methacrylonitrile.

Using a bar coater, the above coating composition was coated in a dry thickness of 0.5 $\mu$m (Example 1) and 2.5 $\mu$m (Example 2) on the deposited side of the silicone oxide vapor-deposited film obtained in Comparative Example 1. The coating was then dried in an oven at 105° C. for 30 seconds, whereby a composite film was obtained.

EXAMPLE 3

To 100 parts by weight of a vinylidene chloride-based copolymer (trade name: Saran Resin F 216, manufactured by Asahi Chemical Industry Co., Ltd.) was added 1.0 part by weight of γ-aminopropyltriethoxysilane (i.e. 3-aminopropyltriethoxysilane) (trade name: TSL 8331, manufactured by Toshiba Silicone Co., Ltd.), and the resultant mixture was dissolved in a mixed solvent of toluene-tetrahydrofuran (½, by weight) to prepare a coating composition of 15% by weight resin concentration for the barrier resin coating layer.

Using a bar coater, this coating composition was coated in a dry thickness of 2.5 $\mu$m on the vapor-deposited surface of the silicon oxide-deposited film obtained in Comparative Example 1 and the coating was dried in an oven at 105° C. for 30 seconds to form a barrier resin coating layer and thereby provide a composite film.

EXAMPLE 4

Vinyltrimethoxysilane (trade name: TSL 8311, manufactured by Toshiba Silicone Co., Ltd.; 1.0 part by weight) was added to 100 parts by weight of a vinylidene chloride-based copolymer (trade name: Saran Resin F 216, manufactured by Asahi Chemical Industry Co., Ltd.). The resultant mixture was dissolved in a mixed solvent of toluene-tetrahydrofuran (½, by weight) to prepare a coating composition of 15% by weight resin concentration for the barrier resin coating layer.

This coating composition was coated, using a bar coater, in a dry thickness of 2.5 $\mu$m on the vapor-deposited surface of the silicon oxide-deposited film obtained in Comparative Example 1 and the coating was dried in an oven at 105° C. for 30 seconds to form a barrier resin coating layer and thereby provide a composite film.

EXAMPLE 5

To 100 parts by weight of a vinylidene chloride-based copolymer (trade name: Saran Resin F 216, manufactured by Asahi Chemical Industry Co., Ltd.) was added 1.0 parts by weight of γ-mercaptopropyltriethoxysilane (i.e. 3-mercaptopropyltriethoxysilane) (trade name: TSL 8380; manufactured by Toshiba Silicone Co., Ltd.), and the resultant mixture was dissolved in a mixed solvent of toluene-tetrahydrofuran (½, w/w) to prepare a coating composition of 15 weight % resin concentration for the formation of a barrier resin coating layer.

Using a bar coater, the above coating composition was coated in a dry thickness of 2.5 $\mu$m on the deposited side of the silicon oxide vapor-deposited film obtained in Comparative Example 1. The coating was then dried in an oven at 105° C. for 30 seconds to prepare a barrier resin coating layer, whereby a composite film was obtained.

EXAMPLE 6

An ethylene-vinyl alcohol copolymer (trade name: Soanol 30L; The Nippon Synthetic Chemical Industry Co. Ltd.; 100 parts by weight) was added with 1.0 parts by weight of γ-glycidoxypropyltrimethoxysilane (trade name: TSL 8350; Toshiba Silicone Co., Ltd.). The resultant mixture was dissolved in a mixed solvent of water -iso-propyl alcohol (1/1, w/w) to prepare a coating composition of 12 weight % resin concentration for the barrier resin coating layer.

Using a bar coater, this coating composition was coated in a dry thickens of 4.0 μm on the vapor-deposited surface of the silicon oxide-deposited film obtained in Comparative Example 1 and the coating was dried in an oven at 115° C. for 1 minute to form a barrier resin coating layer and thereby provide a composite film.

Comparative Example 2

The procedure of Example 1 was repeated except that the silane coupling agent was not used to provide a composite film.

Comparative Example 3

A composite film was obtained in the same manner as Example 2, except that the silane coupling agent was not employed.

Comparative Example 4

Except that the silane coupling agent was not used, a composite film was produced in the same manner as Example 3.

Comparative Example 5

A 12 μm-thick biaxially oriented poly(ethylene terephthalate) film was used as the base film. By the vacuum vapor deposition method using $Al_2O_3$ as the vapor source, a 1,000 Å-thick aluminium oxide layer was formed on one side of the base film in a vacuum of $5 \times 10^{-5}$ Torr to provide a composite film.

EXAMPLES 7 AND 8

To 100 parts by weight of a vinylidene chloride-based copolymer (trade name: Saran Resin F 216; manufactured by Asahi Chemical Industry Co., Ltd.) was added 1.0 part by weight of γ-glycidoxypropyltrimethoxysilane (trade name: TSL 8350, manufactured by Toshiba Silicone Co., Ltd.), and the resultant mixture was dissolved in a mixed solvent of toluene-tetrahydrofuran (½, by weight) to prepare a barrier resin coating composition of 15% by weight resin concentration.

This coating composition was coated in a dry thickness of 0.5 μm (Example 7) and 2.5 μm (Example 8) on the vapor-deposit surface of the aluminium oxidedeposited film obtained in Comparative Example 5 using a bar coater, and the coating was dried in an oven at 105° C. for 30 seconds to form a barrier resin coating layer, and thereby provide a composite film.

EXAMPLE 9

To 100 parts by weight of an ethylene-vinyl alcohol copolymer (trade name: Soanol 30L; The Nippon Synthetic Chemical Industry Co., Ltd.) was added 1.0 part by weight of γ-glycidoxypropyltrimethoxysilane (trade name: TSL 8350, Toshiba Silicone Co., Ltd.), and the resulting mixture was dissolved in a mixed solvent of water-isopropyl alcohol (1/1, by weight) to prepare a coating composition of 12 weight % resin concentration for a barrier resin coating layer.

Using a bar coater, this coating composition was coated in a dry thickness of 4.0 μm on the vapor-deposited surface of the aluminium oxide-deposited film obtained in Comparative Example 5 and the coating was dried in an oven at 115° C. for 1 minute to form a barrier resin coating layer and thereby a composite film was obtained.

Comparative Example 6

A composite film was obtained in the same manner as Example 7 without using the silane coupling agent.

Comparative Example 7

The procedure of Example 8 was repeated to obtain a composite film except that the silane coupling agent was not employed.

Comparative Example 8

A composite film was obtained in the same manner as Example 9 except that the silane coupling agent was not used.

Comparative Example 9

A composite film was produced in the same manner as Example 1 except that a 5.0 μm-thick coating layer was formed on the inorganic oxide layer by using a conventional urethane resin solution not having the barrier properties specified in this specification (trade name: TAKELACQUE A 615; Takeda Chemical Industries, Ltd.) in lieu of the coating composition containing the polyvinylidene chloride-based copolymer.

Comparative Example 10

In lieu of the barrier resin coating layer, a urethane resin adhesive (trade name: ADCOTE 333E; Toyo Molten Co., Ltd.) was coated in a dry thickness of about 2 μm on the deposited side of the inorganic layer of the film obtained in Comparative Example 1. Thereafter, a 30 μm-thick unoriented ethylene-propylene copolymer film was dry-laminated on the coated film to provide a composite film.

Comparative Example 11

In the same manner as in Example 2 except for using a solution of a vinyl chloride-vinyl acetate copolymer (trade name: DENKA 1000C; Denki Kagaku Kogyo Co., Ltd.) to prepare a coating layer in a thickness of 2.5 μm on the inorganic layer in lieu of the coating composition containing the vinylidene chloride-based copolymer, a composite film was obtained.

Comparative Example 12

To 100 parts by weight of a vinylidene chloridebased copolymer (trade name: Saran Resin F 216; Asahi Chemical Industry Co., Ltd.) was added 1.0 part by weight of a polyisocyanate (trade name: COLONATE L; Nippon Polyurethane Industry Co., Ltd.). The resultant mixture was dissolved in a mixed solvent of toluenetetrahydrofuran (½, by weight) to prepare a coating composition of 15 weight % resin concentration for the formation of a barrier resin coating layer, instead of the coating composition containing γ-glycidyloxypropyltrimethoxy silane (trade name: TSL 8350; Toshiba Silicone Co., Ltd.).

Using a bar coater, the above coating composition was coated in a dry thickness of 2.5 mm on the deposited side of the silicon oxide vapor-deposited film obtained in Comparative Example 1. The coating was dried in an oven at 105° C. for 30 seconds to provide a barrier resin coating layer, whereby a composite film was obtained.

Comparative Example 13

One (1) part by weight of a polyisocyanate (trade name: Colonate L; Nippon Polyurethane Industry Co., Ltd.) was added to 100 parts by weight of a vinylidene chloride-based copolymer (trade name: Saran Resin F 216; Asahi Chemical Industry Co., Ltd.). The resultant mixture was dissolved in a mixed solvent of toluene-tetrahydrofuran (½, w/w) to prepare a coating composition of 15% by weight resin concentration for the formation of a barrier coating layer, in lieu of the coating composition containing γ-glycidyloxypropyltrimethoxysilane (trade name: TSL 8350; Toshiba Silicone Co., Ltd.).

This coating composition was coated in a dry thickness of 2.5 μm on the deposited side of the aluminium oxide vapor-deposited film obtained in Comparative Example 5 using a bar coater. The coating was then dried in an oven at 105° C. for 30 seconds to form a barrier resin coating layer and thereby provide a composite flim.

Comparative Example 14

A coating composition containing 15% by weight of the vinylidene chloride-based copolymer used in Example 1 for the formation of the barrier resin coating layer was prepared in the same manner as Example 1 except that the silane coupling agent was not added. Using a bar coater, the above coating composition was coated in a dry thickness of 2.5 μm on a 12 μm-thick biaxially oriented polyethylene terephthalate film without depositing an inorganic layer. The coating was then dried in an oven at 105° C. for 30 seconds to give a barrier resin coating layer, whereby a composite film was obtained.

Comparative Example 15

The coating composition obtained in Example 1 was coated, using a bar coater, in a dry thickness of 2.5 μm on a 12 μm-thick biaxially oriented polyethylene terephthalate film without forming an inorganic layer. The coating was dried in an oven at 105° C. for 30 seconds to give a barrier resin coating layer and whereby provide a composite film.

The oxygen gas permeability, water vapor permeability and film adhesive strength (adhesive strength of covering layer) of the composite films each obtained in the Examples and Comparative Examples were evaluated by the following methods.

Oxygen gas permeability:

By the isobaric method (instrument: Morcon's OXYTRAN TWIN), determinations were made at 20° C. and 65% R.H. The results were expressed in units of cc/m$^2$·24 hr.

Water vapor permeability:

Using an instrument (Morcon's PERMATRAN W200), determinations were made at 40° C. and 90% R.H. The results were indicated in units of g/m$^2$·24 hr.

Film adhesive strength:

An unoriented ethylene-propylene copolymer film in a thickness of about 50 μm was dry-laminated on the coating layer of the test film, and the peel strength (separating strength) between the test film and the unoriented ethylene-propylene copolymer film was evaluated by drawing each film at a rate of 300 mm/min. with the use of an instrument (ORIENTEC's RTM-100).

Furthermore, the film was flexed by hand once and the external force-induced change in barrier properties was investigated by determining the oxygen gas permeability and water vapor permeability before and after flexing. Further, the film was stored at 40° C. and 90% R.H. for 1 week, and change of adhesive properties under high temperature and high humidity conditions was evaluated by determining the adhesive strength of the film before and after storage.

The results are shown in Table 1. It should be noticed that in regard of the film according to Comparative Example 7, the oxygen gas permeability before hand flexing was below the detection limit.

TABLE 1

|  | Barrier resin coating layer (mm) | Oxygen permeability (cc/m$^2$ · 24 hr) | | Water vapor permeability (g/m$^2$ · 24 hr) | | Film adhesive strength (g/15 mm) | |
| --- | --- | --- | --- | --- | --- | --- | --- |
|  |  | Before flexing | After flexing | Before flexing | After flexing | Before storage | After storage |
| Example 1 | 0.5 | 0.05 | 0.2 | 0.7 | 2.6 | 200 | 200 |
| Example 2 | 2.5 | 0.01 | 0.3 | 0.3 | 1.9 | 250 | 240 |
| Example 3 | 2.5 | 0.02 | 0.3 | 0.3 | 1.9 | 250 | 240 |
| Example 4 | 2.5 | 0.02 | 0.3 | 0.3 | 2.1 | 200 | 150 |
| Example 5 | 2.5 | 0.02 | 0.3 | 0.3 | 2.2 | 200 | 150 |
| Example 6 | 4.0 | <0.01 | 0.3 | 0.9 | 2.0 | 250 | 250 |
| Example 7 | 0.5 | 0.07 | 0.3 | 0.5 | 2.8 | 180 | 180 |
| Example 8 | 2.5 | 0.02 | 0.3 | 0.3 | 2.3 | 230 | 220 |
| Example 9 | 4.0 | 0.01 | 0.3 | 0.3 | 2.2 | 230 | 230 |
| Comp. Ex. 1 | — | 2.3 | 15.2 | 2.8 | 16.0 | 140 | <10 |
| Comp. Ex. 2 | 0.5 | 0.05 | 0.2 | 0.7 | 2.6 | 150 | 10 |
| Comp. Ex. 3 | 2.5 | 0.01 | 0.3 | 0.3 | 1.9 | 200 | 10 |
| Comp. Ex. 4 | 4.0 | <0.01 | 0.3 | 0.2 | 2.0 | 200 | 10 |
| Comp. Ex. 5 | — | 3.5 | 16.2 | 3.7 | 17.5 | 120 | <10 |
| Comp. Ex. 6 | 0.5 | 0.07 | 0.3 | 0.9 | 2.8 | 120 | 10 |
| Comp. Ex. 7 | 2.5 | 0.02 | 0.3 | 0.5 | 2.3 | 150 | 10 |

TABLE 1-continued

|  | Barrier resin coating layer (mm) | Oxygen permeability (cc/m² · 24 hr) | | Water vapor permeability (g/m² · 24 hr) | | Film adhesive strength (g/15 mm) | |
| --- | --- | --- | --- | --- | --- | --- | --- |
|  |  | Before flexing | After flexing | Before flexing | After flexing | Before storage | After storage |
| Comp. Ex. 8 | 4.0 | 0.01 | 0.3 | 0.3 | 2.2 | 180 | 10 |
| Comp. Ex. 9 | 5.0 | 2.3 | 3.9 | 2.6 | 4.8 | 180 | 70 |
| Comp. Ex. 10 | 30 | 1.5 | 1.6 | 1.3 | 3.5 | 150 | 60 |
| Comp. Ex. 11 | 2.5 | 2.0 | 5.3 | 2.0 | 4.8 | 150 | 10 |
| Comp. Ex. 12 | 2.5 | 0.01 | 0.3 | 0.3 | 2.0 | 230 | 10 |
| Comp. Ex. 13 | 2.5 | 0.02 | 0.3 | 0.5 | 2.3 | 200 | 10 |
| Comp. Ex. 14 | 2.5 | 8.6 | 10.8 | 9.8 | 11.7 | 260 | 40 |
| Comp. Ex. 15 | 2.5 | 8.2 | 11.0 | 9.4 | 11.9 | 280 | 10 |

Evaluation of the test results (1) In the films where the barrier resin coating layers are not formed (Comparative Example 1 or Comparative Example 5), the barrier properties are significantly sacrificed in comparison with Examples 1 to 6 or Examples 7 to 9, respectively.

(2) In the films where the silane coupling agent is not employed (Comparative Examples 2 to 4, or Comparative Examples 6 to 8), the adhesive properties of covering layer (film adhesive properties) is low even before storage and remarkably deteriorated after storage when respectively compared with Examples 1 to 6 or Examples 7 to 9.

(3) In the films as produced using a resin coating having a low barrier properties in lieu of the barrier resin coating (Comparative Example 11 to 13), the barrier properties and the adherence properties are significantly sacrificed in comparison with Examples 1 to 9.

(4) In the film where a polyisocyanate which is a polyfunctional compound being reactive at ambient temperature is employed instead of the silane coupling agent, the barrier properties and film adhesive properties in ambient conditions are similar to those of the composite film as produced using the silane coupling agent, but the film adhesive properties are extremely decreased after storage at high temperature and high humidity.

(5) In the films as produced without forming an inorganic layer, gas barrier properties are sacrificed, and adhesive properties are remarkably deteriorated when stored in high temperature and/or high humidity conditions.

EXAMPLE 10

A composite film was obtained in the same manner as Example 2 except that a 15 μm-thick biaxially oriented nylon 6 film was used in lieu of the polyethylene terephthalate film.

EXAMPLE 11

The procedure of Example 2 was repeated except for using a 20 μm-thick biaxially oriented polypropylene film in lieu of the polyethylene terephthalate film to give a composite film.

EXAMPLE 12

A coating composition containing 0.2 part by weight of γ-aminopropyltriethoxysilane relative to 100 parts by weight of the vinylidene chloride-based copolymer was prepared in the same manner as Example 3. A composite film was obtained in the same manner as Example 3 except that the above-obtained coating composition was employed in lieu of the coating composition of Example 3.

EXAMPLE 13

A coating composition containing 5 part by weight of γ-aminopropyltriethoxysilane relative to 100 parts by weight of the vinylidene chloride-based copolymer was prepared in the same manner as Example 3. A composite film was obtained in the same manner as Example 3 except that the above-obtained coating composition was employed in lieu of the coating composition of Example 3

EXAMPLE 14

A composite film was obtained in the same manner as Example 3, except that the barrier resin coating layer was formed in a dry thickness of 12 μm on the deposited side of the silicon oxide vapor-deposited film obtained in Comparative Example 1 to give a barrier resin coating layer.

EXAMPLE 15

The procedure of Example 3 was repeated except for forming the barrier resin coating layer in a dry thickness of 5 μm on the deposited side of the silicon oxide vapor-deposited film obtained in Comparative Example 1 to prepare a barrier resin coating layer and thereby to provide a composite film.

The oxygen gas permeability, water vapor permeability and adhesive strength of the covering layer of the obtained composite films were evaluated in the same manner as above. The results are shown in Table 2.

TABLE 2

|  | Barrier resin coating layer (mm) | Oxygen permeability (cc/m² · 24 hr) | | Water vapor permeability (g/m² · 24 hr) | | Film adhesive strength (g/15 mm) | |
| --- | --- | --- | --- | --- | --- | --- | --- |
|  |  | Before flexing | After flexing | Before flexing | After flexing | Before storage | After storage |
| Example 10 | 2.5 | 0.02 | 0.2 | 0.5 | 3.6 | 350 | 280 |
| Example 11 | 2.5 | 0.2 | 1.7 | 0.2 | 0.7 | 150 | 130 |
| Example 12 | 2.5 | 0.02 | 0.3 | 0.3 | 2.0 | 250 | 180 |
| Example 13 | 2.5 | 0.03 | 0.3 | 0.3 | 1.6 | 280 | 240 |
| Example 14 | 12 | <0.01 | 0.3 | 0.1 | 1.5 | 230 | 200 |
| Example 15 | 5 | <0.01 | 0.3 | 0.3 | 1.8 | 240 | 220 |

We claim:

1. A barrier composite film which comprises a base film layer, an inorganic thin layer having a thickness of 100 to 5,000 Å formed on at least one side of said base film layer, and a gas barrier resin coating layer containing a silane coupling agent formed on said inorganic thin layer.

2. A barrier composite film according to claim 1, wherein said base film layer is formed with a polypropylene, a polyalkylene terephthalate or a polyamide.

3. A barrier composite film according to claim 1, wherein said inorganic thin layer is transparent to visible light.

4. A barrier composite film according to claim 1, wherein said inorganic layer is formed with at least one oxide of a metal selected from the group consisting of Group 2A elements, transitional metal elements, Group 2B elements, Group 3B elements, Group 4B elements and Group 6B elements of Periodic Table of the Elements.

5. A barrier composite film according to claim 1, wherein said inorganic layer is formed with an oxide of a Group 3B element or Group 4B element of Periodic Table of the Elements.

6. A barrier composite film according to claim 1, wherein said inorganic layer is formed with a silicon oxide.

7. A barrier composite film according to claim 1, wherein said gas barrier resin coating layer comprises a copolymer of vinylidene chloride with other copolymerizable monomers or an ethylene-vinyl alcohol copolymer.

8. A barrier composite film according to claim 7, wherein said gas barrier resin coating layer comprises at least one barrier resin selected from the group consisting of a vinylidene chloride-acrylonitrile copolymer, a vinylidene chloride-methacrylic acid copolymer,a vinylidene chloride-alkyl acrylate copolymer, a vinylidene chloride-acrylic acid copolymer, a vinylidene chloride-alkyl methacrylate copolymer, a vinylidene chloride-vinyl acetate copolymer and a solvent-soluble or dispersible ethylene-vinyl alcohol copolymer with an ethylene content of 5 to 50 mol %.

9. A barrier composite film according to claim 1, wherein said silane coupling agent has at least one functional group selected from the group consisting of a halogen atom, an epoxy group, an amino group, a hydroxyl group, a mercapto group, a vinyl group and a (meth)-acryloyl group, and an alkoxy group.

10. A barrier composite film according to claim 1, wherein said silane coupling agent is a compound shown by the following formula

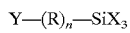

Y—(R)$_n$—SiX$_3$ wherein Y is one functional group selected from the group consisting of a halogen atom, an epoxy group, an amino group, a mercapto group, a vinyl group and a (meth)acryloyl group, R represents a hydrocarbon residue, X indicates the same or different alkoxy group and n denotes 0 or 1.

11. A barrier composite film according to claim 10, wherein the hydrocarbon group represented by R is a $C_{1-4}$ alkylene group, or $C_{5-8}$ cycloalkene-$C_{1-4}$ alkyl residue, the double bond of said cycloalkene being epoxidated, and X is the same or different methoxy group or ethoxy group.

12. A barrier composite film according to claim 10, wherein n is 0 with a proviso that Y is a vinyl group.

13. A barrier composite film according to claim 1, wherein the proportion of the silane coupling agent is 0.05 to 10 parts by weight relative to 100 parts by weight of the gas barrier resin.

14. A barrier composite film according to claim 1, wherein the proportion of the silane coupling agent is 0.1 to 7 parts by weight relative to 100 parts by weight of the gas barrier resin.

15. A barrier composite film according to claim 1, wherein the thickness of the gas barrier resin coating layer is 0.05 to 15 μm.

16. A barrier composite film according to claim 1, wherein the ratio of the thickness T μm of said gas barrier resin coating layer relative to the thickness t μm of said inorganic layer is T/t =0.1 to 1,500.

17. A barrier composite film according to claim 1, wherein the ratio of the thickness T μm of said gas barrier resin coating layer relative to the thickness t μm of said inorganic layer is T/t =0.5 to 500.

18. A barrier composite film according to claim 1, wherein said film comprises a polypropylene, polyalkylene terephthalate or polyamide base film layer, an inorganic layer formed from a silicon oxide of the composition formula SiOx wherein x is defined by $0 < x \leq 2$ and having a thickness of 100 to 5,000 Å and a gas barried resin coating layer comprising a silane coupling agent and a copolymer of vinylidene chloride with other copolymerizable monomers or ethylene-vinyl alcohol copolymer, said inorganic layer and barrier resin coating layer being formed in the order mentioned on at least one surface of said base film layer and the ratio of the thickness T μm of said barrier resin coating layer relative to the thickness t μm of said inorganic layer being in the range of 1 to 200.

19. A barrier composite film according to claim 1, wherein at least one surface of a polypropylene, polyalkylene terephthalate or polyamide base film layer is successively covered with an inorganic layer formed from an electrically nonconductive inorganic substance in a thickness of 200 to 3,000 Å, and a gas barrier resin coating layer formed in a thickness of 0.1 to 10 μm in that order.

20. A barrier composite film according to claim 1, wherein the peeling strength of the coating layer relative to the base film layer after storage at a temperature of 40° C. and relative humidity of 90% for 1 week is not less than 100 g/15 mm.

21. A barrier composite film according to claim 1, wherein the composite film shows an oxygen gas permeability of not greater than 5 cc/M$^2$ 19 24 hr. at 25° C., and a water vapor permeability of not greater than 5 g/m$^2$ ·24 hr. at 40° C. and relative humidity of 90% as determined with a base film layer thickness of 10 to 30 μm and a thickness of a covering layer comprising the inorganic layer and the coating layer of 0.5 to 5 μm.

22. A barrier composite film according to claim 1, wherein the other side of said base film or the surface of said gas barrier resin coating layer is covered with a heat-sealing layer.

23. A process for producing a barrier composite film which comprises depositing an inorganic thin layer having a thickness of 100 to 5,000 Å on at least one side of a base film and coating the deposited side of said base film with a coating composition containing a silane coupling agent and a gas barrier resin.

24. A process for producing a barrier composite film according to claim 23, wherein a heat-sealing layer is formed in a thickness of 3 to 100 μm on said coating layer or on the other side of said base film.

* * * * *

UNITED STATES PATENT AND TRADEMARK OFFICE
CERTIFICATE OF CORRECTION

PATENT NO. : 5,770,301
DATED : June 23, 1998
INVENTOR(S) : Takaaki Murai et al.

It is certified that error appears in the above-identified patent and that said Letters Patent is hereby corrected as shown below:

<u>Claim 18,</u>
Line 6, change "barried resin" to -- barrier resin --.

<u>Claim 21,</u>
Line 3, change "5cc/M$^2$ 19 24 hr. at 25°C" to -- 5cc/m$^{2\cdot}$24 hr. at 25°C --.

Signed and Sealed this

Second Day of April, 2002

Attest:

JAMES E. ROGAN
Attesting Officer   Director of the United States Patent and Trademark Office